United States Patent [19]

Harney

[11] 4,276,362

[45] Jun. 30, 1981

[54] DEPOLARIZERS FOR LITHIUM HALIDE BATTERIES

[75] Inventor: Marilyn J. Harney, Murrysville, Pa.

[73] Assignee: Catalyst Research Corporation, Baltimore, Md.

[21] Appl. No.: 73,188

[22] Filed: Sep. 7, 1979

[51] Int. Cl.³ .................................. H01M 4/60
[52] U.S. Cl. ................................ 429/213; 429/218
[58] Field of Search ............................... 429/213, 218

[56] References Cited

U.S. PATENT DOCUMENTS

| | | |
|---|---|---|
| 2,874,204 | 2/1959 | Morehouse et al. ............ 429/213 X |
| 3,231,427 | 1/1966 | Kirk et al. ............................ 429/213 |
| 3,352,720 | 11/1967 | Wilson et al. ....................... 429/213 |
| 3,660,163 | 5/1972 | Moser ................................. 429/213 X |
| 3,674,562 | 7/1972 | Schneider et al. .................. 429/213 X |
| 4,029,854 | 6/1977 | Walsh et al. ...................... 429/213 X |
| 4,148,975 | 4/1979 | Schneider et al. ................. 429/213 X |
| 4,148,976 | 4/1979 | Sekido et al. ...................... 429/213 X |

*Primary Examiner*—Charles F. LeFevour
*Attorney, Agent, or Firm*—Reed, Smith, Shaw & McClay

[57] ABSTRACT

The present invention relates to a depolarizer for use in a lithium halide battery which comprises a halogen and a charge transfer complex consisting of the halogen and an organic component of (a) quaternary amine halide selected from the group consisting of (i) polyvinylalkylpyridinium halide or polyvinylalkylquinolinium halide and (ii) poly [N,N'-dialkyl 1,2 bis (4-pyridinium halide)] ethylene or poly [N-alkyl 1,2 bis (4-pyridinium halide) ethylene] and (b) phenyl methane dyes wherein said halogen is present in an amount of from about 3 to 50 parts by weight for each part of organic component.

13 Claims, 5 Drawing Figures

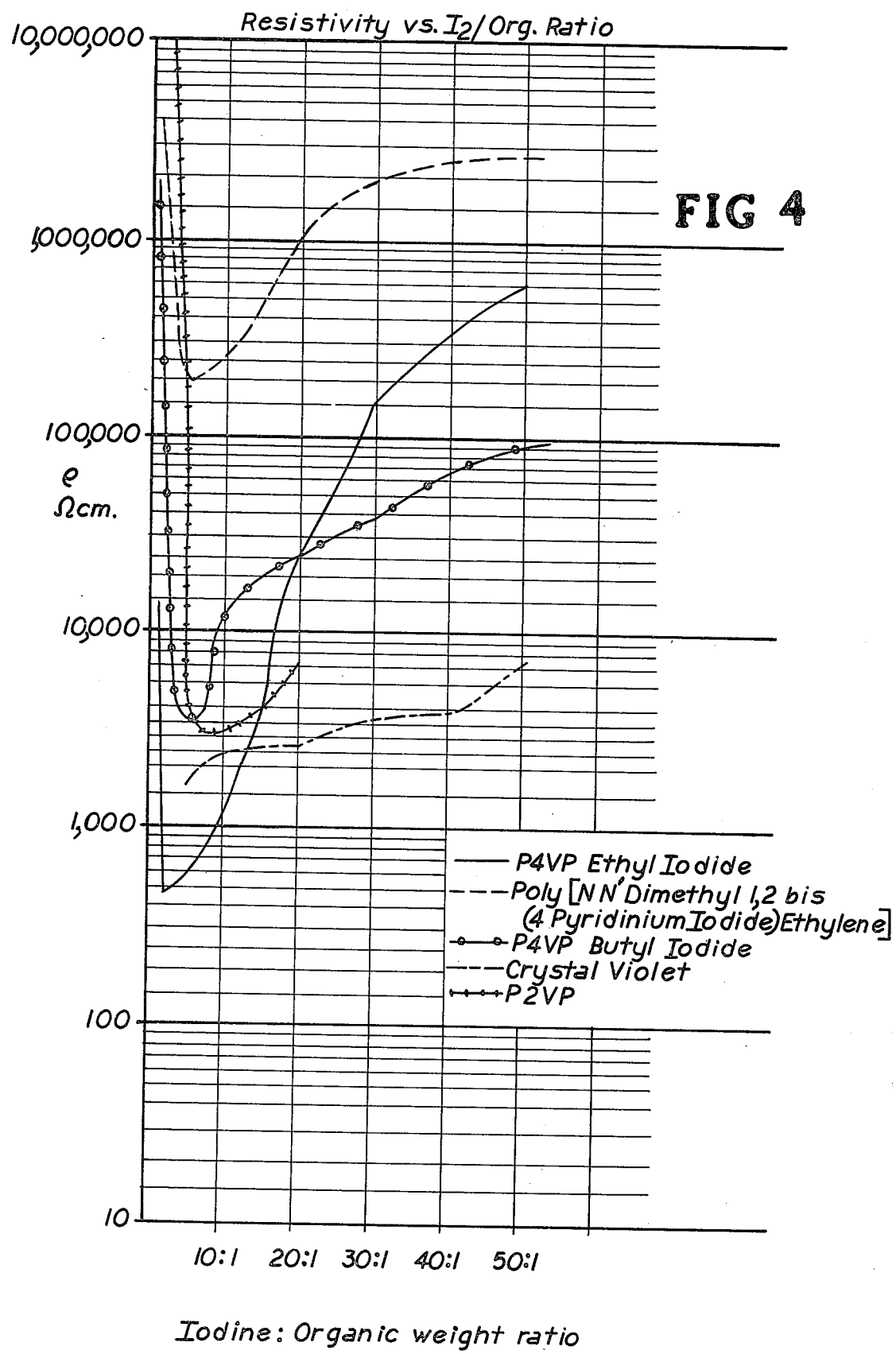

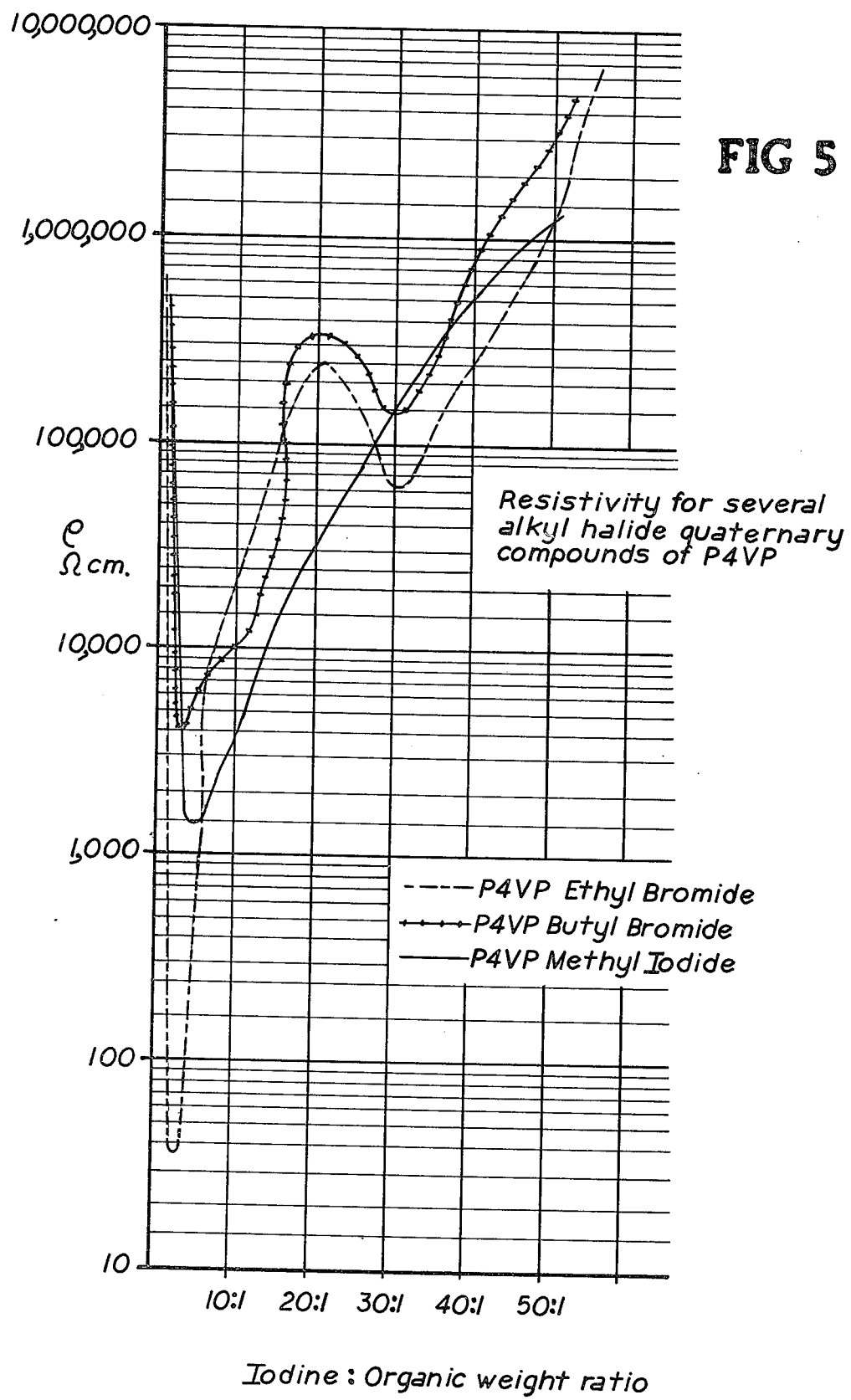

DEPOLARIZERS FOR LITHIUM HALIDE BATTERIES

FIELD OF THE INVENTION

The present invention relates to an improved depolarizer for use in lithium halide batteries and, in particular, to a new class of depolarizers which comprise a stoichiometric excess of halogen and a halogen charge transfer complex with either a polyquaternary amine halide or a di- or triphenyl methane dye organic component.

BACKGROUND OF THE INVENTION

The applicability of organic semiconductor materials as a battery depolarizer component has become well known in the art. Typically, these depolarizers fall into two classes of semiconductor material: molecular crystals and charge transfer complexes. See generally, *Proceeding of the International Conferences of Semiconductor Physics*, Prauge, 1960. While these materials are known to be useful, their physical and electrochemical nature are not well understood. For the purposes of this invention, the most pertinent prior art relates to primary batteries which utilize a halogen and an organic charge transfer complex, particularly halide complexes.

While it has been generally known that halogens such as iodine together with various organic oxidizing materials are useful as the cathode material in primary cells, U.S. Pat. Nos. 2,874,204 and 2,880,122 as well as polyhalides, U.S. Pat. Nos. 2,905,740 and 3,057,760, their use with various organic charge transfer materials is preferred. It has been found that halogen and charge transfer complexes are the preferred depolarizer material for batteries requiring long life and relatively low drain (less than 100 $\mu a$). For example, see U.S. Pat. No. 3,110,630 (organic and inorgano-inorganic Lewis acid/base complexes); U.S. Pat. No. 3,321,427 (quaternary ammonium halide compounds).

In U.S. Pat. Nos. 3,660,163 and 3,674,562, lithium halide batteries are disclosed that use new charge transfer complexes mixed with iodine in amounts in excess of stoichiometric and greater than that previously known to be useful. Improvements in those batteries are disclosed in U.S. Pat. No. 4,148,975 in which is disclosed a lithium halide primary cell using an improved depolarizer comprising a particulate mixture of iodine, an organic polymer of either poly-2-vinylpyridine or poly-2-vinylquinoline and a charge transfer consisting of the selected organic and iodine. Lithium halide batteries utilizing those depolarizers have significant advantages over other prior art cells, particularly in terms of shelf life and current capacity.

Disclosed simultaneously with U.S. Pat. No. 4,148,975 was a solid state lithium iodine battery, U.S. Pat. No. 4,148,976 in which the lithium iodine electrolyte is claimed to be doped with a 1-normal-alkyl-pyridinium iodide. The cathode material is stated to be composed of a mixture of a liquid, nonpolymeric, charge transfer complex consisting of a mixture of iodine and 1-normal-alkyl-pyridinium and a nonconductive powder. The powder is said to be added in an amount to permit the cathode to be press-moldable. While such batteries are purported to have good storage life, no self-discharge data is provided to verify such claims. Also, while initial current density of these batteries is higher than those made in accordance with U.S. Pat. No. 4,148,975, the current capacity of such batteries at drains of less than 100 $\mu a$ is less than those prepared in accordance with U.S. Pat. No. 4,185,975. More importantly, the coulombic capacity of the depolarizer of U.S. Pat. No. 4,148,976 is approximately 3.5 times less than such capacity for the depolarizer of U.S. Pat. No. 4,148,975 and three times less than that of the present invention.

It is therefore an object of the present invention to provide a depolarizer for use in primary cells which have better current capacity at both high and low current drains than the depolarizers disclosed in U.S. Pat. Nos. 4,148,975 or 4,148,976. The depolarizers of the present invention also have increased steady state current densities than those of U.S. Pat. No. 4,148,975. It is a further object to provide such increased steady state current densities and capacity without any increase in undesirable self-discharge. It is also an object of the present invention to provide a depolarizer for use in lithium batteries which affords greater pulsing capabilities from the battery.

SUMMARY OF THE INVENTION

Generally, the depolarizer of the present invention comprises a mixture of halogen, preferably iodine or bromine and a charge transfer complex of the halogen and an organic component selected from the group consisting of either a poly-quaternary amine halide, preferably of poly-2 or 4-vinylalkylpyridinium halide, poly [N,N' dialkyl 1,2 bis (4 pyridinium halide)] ethylene or poly N alkyl 2-methyl 5 vinyl pyridinium halide and a di- or triphenyl methane dye. The polyquaternary amine halide components of the charge transfer complexes of the present invention are characterized by the general formulae:

(a) (i) for polyvinylalkylpyrindinium halide:

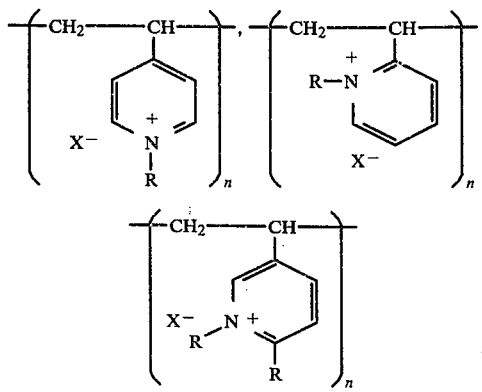

(ii) for polyvinylalkylquinolinium halide:

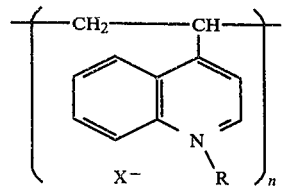

(b) for (i) poly [N,N' dialkyl 1,2 bis (4 pyridinium halide) ethylene]:

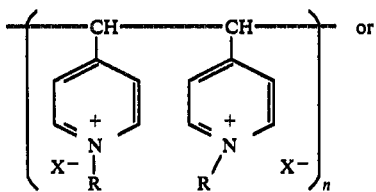

(ii) poly [N-alkyl 1,2 bis (4 pyridinium halide) ethylene]:

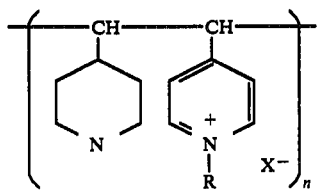

(c) for phenyl methane dyes:

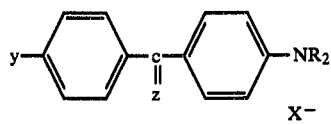

where:
R is a radical selected from the group consisting of $H^-$, $CH_3^-$, $C_2H_5^-$, $C_3H_7^-$, $C_4H_9^-$;
X is a halogen or $HSO_4^-$;
y is $H^-$ or $R_2N$;
Z is $R_2N$ or

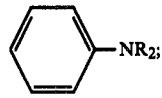

$R_2$ is a radical selected from $H_2$, $(CH_3)_2$, $(C_2H_5)_2$ or $(CH_3)H$; and
n is an integer The depolarizer of the present invention is further characterized by the fact that the halogen is present in an amount greater than stoichiometric and, preferably, from about 3 to 50 parts (by weight) of each part of organic component. The preferred ratio being from about 20:1 to about 30:1 halogen to salt.

The preferred polyquaternary amine halides are poly-4-vinylmethyl pyridinium iodide (P4VP methyl iodide), poly-2-vinylmethylpyridinium iodide (P2VP methyl iodide), poly-N-dimethyl 1,2 bis (4-pyridinium (iodide) ethylene, poly [N,N' dimethyl 1,2 bis (4 pyridinium halide) ethylene], poly-4-vinylethylpyridinium bromide (P4VP ethyl bromide) poly-4-vinylbutylpyridinium iodide (P4VP butyl iodide), poly-4-vinylbutylpyridinium bromide (P4VP bromide), poly-4-vinylpropyliodide (P4VP propyl iodide), poly-4-vinylethyliodide (P4VP ethyl iodide) and poly-N-alkyl 2 ethyl 5 vinylpyridinium iodide. The phenyl methane dyes which are preferred for use in a charge transfer complex in the present invention include crystal violet, basic fuchsin, methyl violet, auramine 0, and brilliant green. Generally, the polyquaternary amine halides are preferred over the dyes because a number of the dyes have been found to be possible carcinogens.

In the preparation of the polyquaternary amine salts, two methods have been proven useful: (a) direct quaternization of the polymer with the more reactive alkyl halides using an excess of alkyl halide as the reaction solvent and (b) quaternization and polymerization of the vinyl monomers by alkyl halide in ethanolic solution (solution polymerization) and in the absence of a solvent (bulk polymerization).

It is more desirable to polymerize the monomer using the desired alkyl halide, such as methyl iodide, as an initiator, because of their availability and variety. In such cases quaternization actually drives the polymerization. Preferably the reaction system should be free of carbon dioxide which normally acts as a polymerization inhibitor, it having been determined, generally, that the greater the degree of polymerization the better the current density and capacity of the depolarizer.

A further characterization of the polyquaternary amine halides of the present invention is that their polymerization precursors undergo the Menshutkin Reaction as illustrated in the following general reaction formulae:

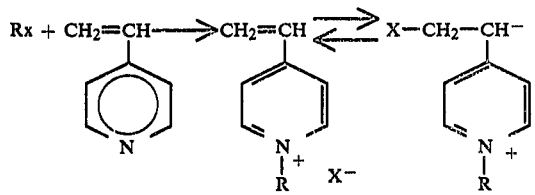

The polymerization proceeds in accordance with the general formula:

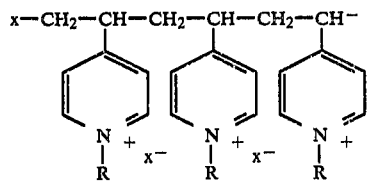

Preferably, the polymerization reaction is carried out as a bulk reaction, as morefully explained hereinafter, rather than in solution to obtain a higher degree of polymerization. While it has been determined that the degree of polymerization is higher using the bulk reaction of the present invention rather than the solution reactions described herein, any method which provides a higher degree of both polymer and quaternized amines. Any process which favors polymerization without quaternization is undesirable. A number average molecular weight of ($\overline{M}n$) 1335 has been determined for solution polymerized poly N (ethyl-4-vinylpyridinium iodide) and ($\overline{M}n$) 1010 and 1552 for two different batches of solution polymerized poly (N-methyl-4-vinylpyridinium iodide).

In the preferred range of halogen to charge transfer complex, the resulting depolarizer morphology may range from "tacky" to very fluid. For normal battery applications it is preferable that the depolarizer be dry in order to pelletize it in automatic pressing machines. It should be noted that while it is normally desirable to pelletize the depolarizer, it may also be used in the fluid state; however, use in such state may result in somewhat higher self discharge characteristics.

In the present invention, the use of polyvinylpyrollidone or polyvinyl pyridine and magnesium oxide are the preferred absorbants. With respect to the polyquaternary amine halides and halogen the absorbant preferably comprises 5 to 10% of polyvinylpyrollidone and 5 to 8% of MgO by weight of the depolarizer. In the production of high drain batteries (>100 μa) a typical mix would be about 14 to 16% absorbent (e.g. 8% organic and 6–8% MgO). For the phenyl methane dyes, it has been found desirable to use polyvinylpyridine (P2VP) and MgO as the absorbants. For example, with crystal violet (a much preferred methane dye) the absorbent comprises approximately 2% MgO and 10% P2VP by weight of the depolarizer.

Referring to Table I below, a comparison of the initial short circuit current and maximum constant current at 37° C. for various depolarizers of the present invention are shown. Except as otherwise indicated the depolarizers utilized an iodine to salt ratio of 30:1.

TABLE I

| DEPOLARIZER | INITIAL SCC AT ROOM TEMP. | MAX. CONSTANT CURRENT AT 37° C. AND AT WHICH CELL DELIVERS RATED CAPACITY ABOVE 1.5v* |
|---|---|---|
| 1. Crystal violet 2% MgO - 10% P2VP | 5.80 Ma/Cm$^2$ | 75.3 μa/Cm$^2$ to 62% capacity* |
| 2. P4VP ethyl bromide 10–16% MgO . PVP sol. polymerization | 1.24 Ma/Cm$^2$ | 67 μa/Cm$^2$ to 33% capacity |
| 3. P4VP ethyl iodide 16% MgO . PVP | | |
| (a) bulk polymerization | 3.19 Ma/CM$^2$ | 71 μa/Cm$^2$ to 87% capacity |
| (b) solution polymerization | 1.45 Ma/CM$^2$ | 27 μa/Cm$^2$ 31.1% capacity |
| 4. P4VP ethyl bromide 15% MgO . PVP | 2.6 Ma/Cm$^2$ | 66.7 μa/Cm$^2$ to 73% capacity |
| 5. Poly [N-methyl 1,2 bis (4 pyridinium iodide) ethylene] (20:1 I$_2$/sale) 5% PVP | 2.0 Ma/Cm$^2$ | 66.4 μa/Cm$^2$ 66.4% capacity |
| 6. P2VP (20:1) No adsorbent, made in accordance with U.S. Pat. No. 4,148,975 | 0.22 Ma/Cm$^2$ | 15.1 μa/Cm$^2$ to 94% capacity |
| 7. 1-Butyl-pyridinium iodide | 13 Ma/Cm$^2$ | 8.8 μa/Cm$^2$ to 10% capacity** |

*Capacity refers to the utilization of available halogen.
**Not the maximum capacity; cell was not tested at high current drain.

As can be seen from Table I, batteries made with the depolarizer of the present invention have both higher initial short circuit currents as well as better maximum constant current capacity than those made in accordance with U.S. Pat. No. 4,148,975. Because of the use of absorbents in the pelletized depolarizers of the present invention, approximately 10 to 16% of the capacity which would otherwise be available to halogen is lost. Also, because of the greater polymerization achieved by the bulk procedure, both higher initial currents as well as greater current capacity is achieved over those made by solution polymerization.

Calorimetric tests on the depolarizers indicate that the self-discharge as measured heat outputs are comparable to poly-2-vinylpyridine/iodide charge transfer complexes which have been heated. Unlike the unquaternized polyvinylpyridine, heat treating quaternized polyvinylpyridine does not affect its heat output, see Table II.

TABLE II

| Composition | Iodine/Organic Complex | Heat Output in μW @ 37° C. |
|---|---|---|
| 1. Crystal Violet | 30:1 | 2.0 |
| 2. Crystal Violet | 50:1 | 1.87 |
| 3. Methyl Violet | 40:1 | 1.87 |
| 4. Poly Quaternary 2-vinylpyridine | 30:1 | 2.0 |
| 5. Poly Quaternary 4-vinylpyridine (Heat treated @ 70° C. for 15 hrs) and 50% polyvinylpyrollidone | 30:1 | 2.4 |
| 6. Poly Quaternary 4-vinylpyridine | 30:1 | 2.0 |

BRIEF DESCRIPTION OF THE DRAWINGS

FIGS. 4 and 5 are graphs showing the resistivities of various depolarizers at different ratios of halogen to charge transfer complex.

BEST MODES

Figure 1:
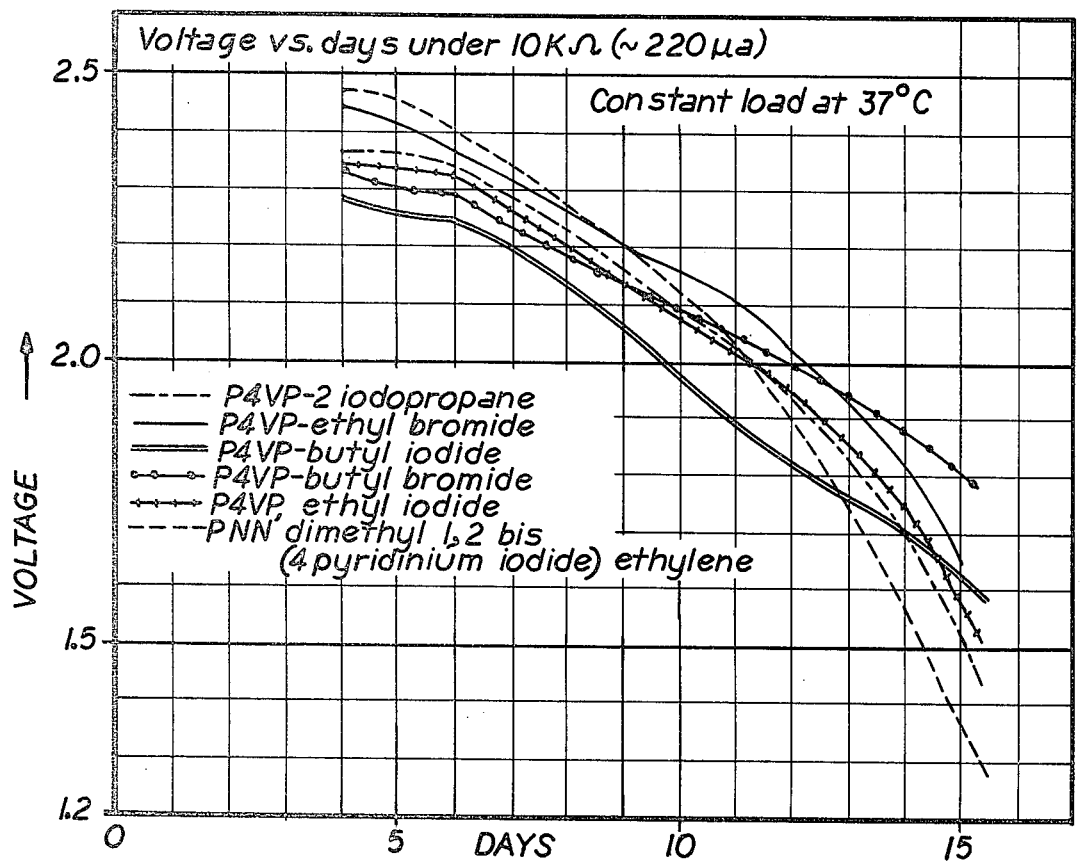
FIGS. 1 and 2 are graphs of discharge curves of batteries utilizing various depolarizers of the present invention.
Figure 2:
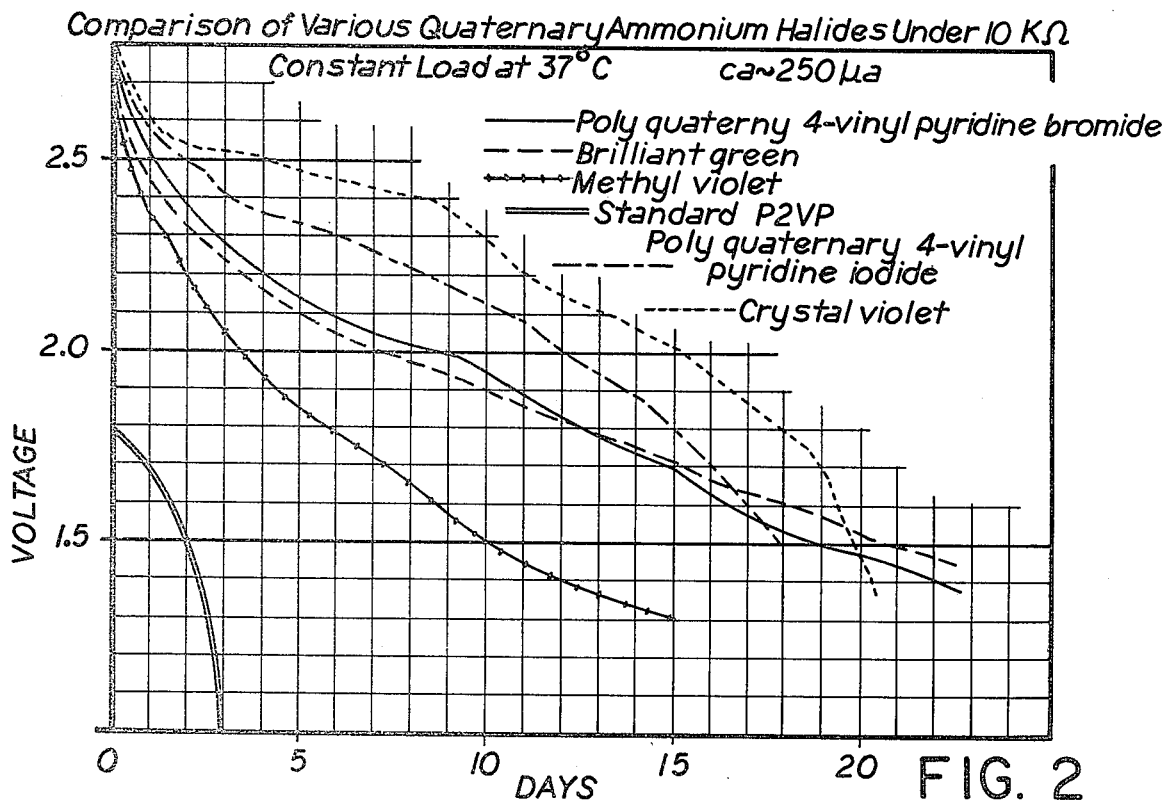

Referring to FIGS. 1 and 2 are discharge curves of batteries made from the depolarizers of the present invention. These batteries (of the type used in watches) normally have a lithium area of 3.45 cm$^2$ and a depolarizer volume of 0.20 cc. These batteries were discharged through a 10 kΩ (equivalent to about 220 μa) which is greatly in excess of the types of loads for which they are designed (approx. 2–4 μa). Also included in FIG. 2 is the discharge curve of a battery made with polyvinylpyridine which indicates the large degree of improvement obtained using the quaternized depolarizers.

Figure 3:
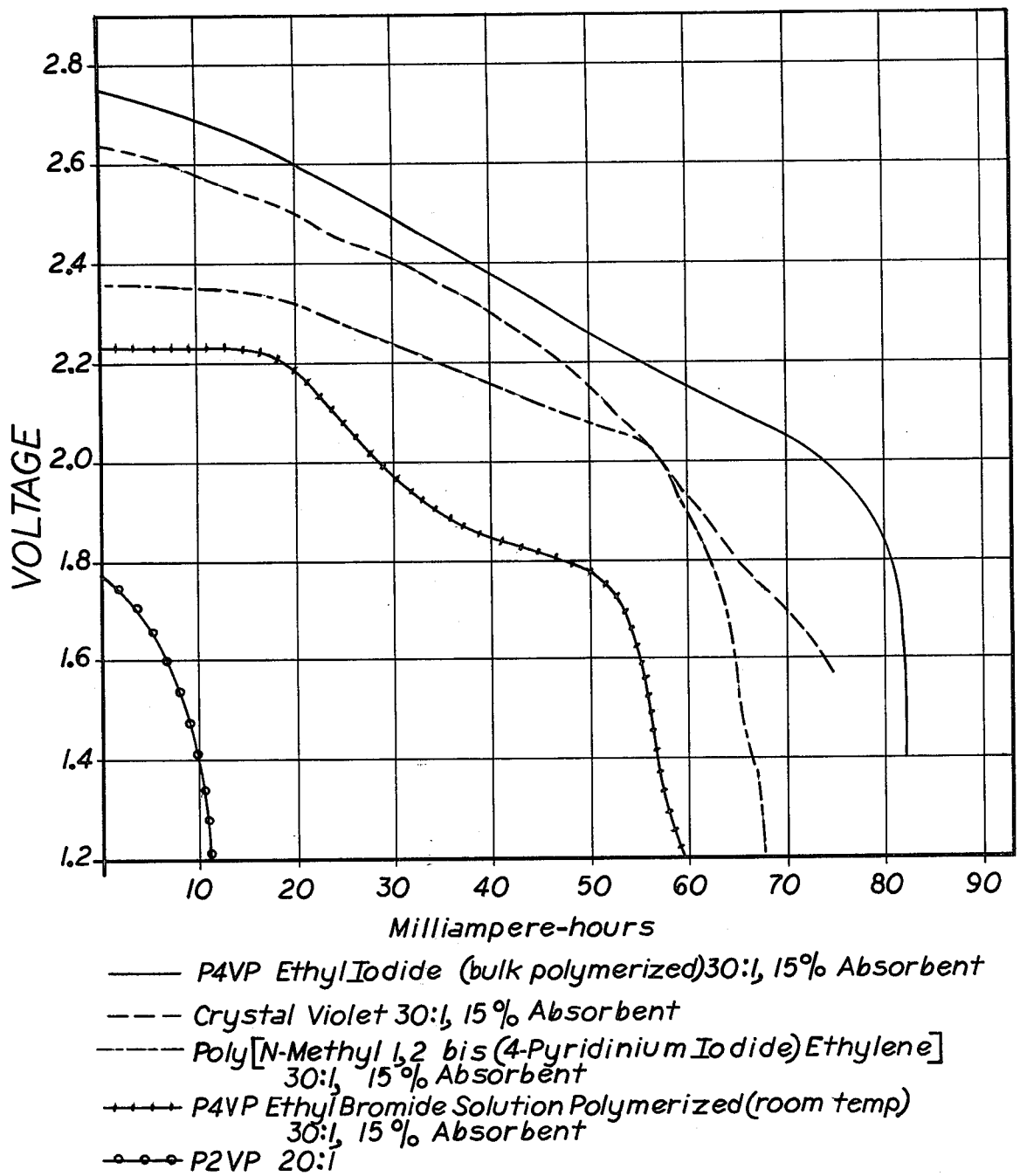
FIG. 3 is a graph showing the coulombic capacity of batteries using depolarizers of the present invention.

Referring to FIG. 3, typical batteries (watch cells) were discharged under load (high drains) and their voltage plotted against their capacity as expressed in milliampere hours. FIG. 3 is representative of the coulombic capacity of the cell. Typically, batteries made with the depolarizers of the present invention have a coulombic capacity, based on cathode volumes, of about 510 milliampere hour (MAHR)/cc. This compares with the nonquaternized P2VP depolarizers which have a capacity of about 600 milliampere hr/cc. The slight difference is due to the presence of absorbant in the cells of the present invention. However, this capacity is available at much higher discharge rates than in cells using nonquaternized P2VP depolarizers. FIGS. 4 and 5 are a comparison of the resistivities of the depolarizers of the present invention as well as the non-quaternized P2VP.

To better appreciate the advantages of the invention the following detailed description of presently preferred embodiments of the batteries incorporating the depolarizers is to be taken in connection with the accompanying tables which tabularize the performance data of sets of batteries. The following examples illustrate both the solution method of quaternization and preferred bulk method. The first example is illustrative of the solution method and Example II illustrates the bulk reaction procedure.

EXAMPLE I

Preparation of poly(1-methyl-4-ethenylpyridinium iodide)

To a 1500 ml flask add 230 ml of type 3A ethyl alcohol and 30 ml of deionized water and agitate to prepare a solvent. Place 200 ml of the solvent and 103 ml of 4-vinylpyridine monomer in a 500 ml flask, mixing by gentle swirling action. The monomer solution is then placed in a resin kettle and stirred. The solution is then purged with argon for almost 10 minutes.

50 ml of the solvent and 68 ml of methyl iodide are placed in a flask and argon is bubbled through the solution for about 10 minutes. This solution of methyl iodide is placed in a dropping funnel.

The monomer in the resin kettle is heated to about 30° C. while stirring and 5 ml of the methyl iodide solution is added. Additional methyl iodide solution is added until a slight rise in the temperature (exotherm) is noted and the addition is then made in dropwise amounts (approx. 1 ml/min) while the temperature is maintained between 25° C. and 32° C. After all of the methyl iodide has been added, stirring is continued until the solution has reached room temperature. The solids are then isolated by suction filtration, collected in a beaker and washed with twice their volume of ethanol. The washing is filtered and thereafter placed in a cold-trapped vacuum chamber for about 24 hours. The resulting polymeric solid ground to a fine powder and dried under vacuum.

Preparation of Depolarizer

Iodine is weighed into an amount of from 2 to 50 parts by weight of the organic salt and placed into a freezer to chill. The polyquaternary ammonium iodide salt prepared in the manner described above is weighed and mixed with 5 to 8% by weight of absorbent (MgO) or polyvinyl pyrollidone) which is of a particle size of 200 mesh or less (See U.S. Pat. No. 4,148,975) and placed in a freezer to chill. After the polyquaternary ammonium iodide, absorbent, and the iodine have chilled, they are mixed together to form the depolarizer which is chilled. The chilled depolarizer is then pelletized for use in batteries such as those shown and described in U.S. Pat. No. 4,148,975.

EXAMPLE II

Bulk polymerization of poly N methyl 1,2bis(4-pyridinium iodide) ethylene. 10 grams of 1,2bis(4-pyridine) ethylene to which 15.5 grams of methyl iodide were added were stirred in a beaker chilled in an ice bath (Approx. 4° C.). An additional 25 ml of methyl iodide were added and the beaker covered to prevent evaporation of the alkyl halide. An orange powder, approximately 70% soluble in water was recovered.

The temperature of polymerization is adjusted for the reactivity of the monomer and the alkyl halide so as to maximize quaternization of the polymer and minimize thermal polymerization. Preferred temperature range is from about 4° to 7° C. Higher temperatures, however, have been used. Temperatures above room temperature (>25° C.) have lead to violent, uncontrolled reactions resulting primarily in the formation of thermal polymers.

Tables III-XVI summarize the mean performance of batteries using depolarizers of the present invention. The Tables III through XIV represent the mean of 10 batteries (except Table XII which represents the performance of 3 batteries) and Tables XV and XVI represent the mean of 9 batteries. Table XVII represents the performance of 10 batteries using crystal violet. All of the batteries used in these tests were of the type designed for use in electric watches. The batteries have a depolarizer thickness of 0.57 mm; depolarizer area of 3.57 $cm^2$ and depolarizer volume of 0.20 $cm^3$. The lithium area is 3.45 $cm^2$. All tests were conducted at approximately 37° C., except table XVII, and data recordation was programmed to terminate when the batteries output voltage decreased to 0.8 volts. All voltages are expressed in millivolts; MAH represents milliampere hours; impedance is expressed in ohms.

Tables III and IV:
P4VP butyl iodide, 30:1 iodine: organic ratio, 15% absorbent.
Bulk polymerized.
Batteries tested at 37° C.

TABLE III

| KΩ LOAD | DAYS ON TEST | VOLTAGE MEAN | IMPEDANCE MEAN | MEAN MAH | NUMBER OF GOOD READINGS |
|---|---|---|---|---|---|
| 9999 | 0 | 2582.9 | 517.6 | 0.0 | 8 |
| 10 | 1 | 2288.9 | 1439.1 | 0.0 | 8 |
| 10 | 6 | 2288.9 | 1439.1 | 27.5 | 8 |
| 10 | 7 | 2245.1 | 1573.1 | 32.9 | 8 |
| 10 | 9 | 2177.4 | 1799.1 | 43.5 | 8 |
| 10 | 13 | 1950.1 | 2537.9 | 63.3 | 8 |
| 10 | 15 | 1747.0 | 3156.3 | 72.2 | 8 |
| 10 | 16 | 1615.9 | 3692.9 | 76.2 | 8 |
| 10 | 17 | 1387.2 | 4473.5 | 79.9 | 8 |
| 10 | 20 | 901.6 | 6095.0 | 88.1 | 1 |

TABLE IV

| KΩ LOAD | DAYS ON TEST | VOLTAGE MEAN | IMPEDANCE MEAN | MEAN MAH | NUMBER OF GOOD READINGS |
|---|---|---|---|---|---|
| 9999 | 0 | 2721.6 | 342.3 | 0.0 | 7 |
| 25 | 1 | 2637.6 | 883.4 | 0.0 | 7 |
| 25 | 6 | 2637.6 | 883.4 | 12.7 | 7 |
| 25 | 7 | 2627.7 | 957.9 | 15.2 | 7 |
| 25 | 9 | 2605.6 | 1078.3 | 20.2 | 7 |
| 25 | 13 | 2557.4 | 1423.0 | 30.1 | 7 |
| 25 | 15 | 2540.2 | 1565.4 | 35.0 | 7 |
| 25 | 16 | 2520.1 | 1734.7 | 37.5 | 7 |

TABLE IV-continued

| KΩ LOAD | DAYS ON TEST | VOLT-AGE MEAN | IMPE-DANCE MEAN | MEAN MAH | NUMBER OF GOOD READINGS |
|---|---|---|---|---|---|
| 25 | 17 | 2517.3 | 1730.0 | 39.9 | 7 |
| 25 | 20 | 2471.8 | 2048.7 | 47.1 | 7 |
| 25 | 21 | 2276.5 | 3637.6 | 49.3 | 7 |
| 25 | 22 | 2456.7 | 2158.4 | 51.6 | 7 |
| 25 | 27 | 2381.2 | 2710.3 | 63.2 | 7 |
| 25 | 28 | 2355.1 | 2894.4 | 65.5 | 7 |
| 25 | 35 | 2000.8 | 5582.9 | 80.1 | 7 |
| 25 | 38 | 1504.8 | 9479.9 | 85.2 | 7 |
| 25 | 42 | 0.0 | 0.0 | 88.1 | 0 |

Tables V and VI
P4VP ethyl iodide, 30:1 iodine: organic ratio, 15% absorbent.
Bulk polyerized (52.5 g 4VP and 70.19 g ethyl iodide @ 25° C.)
Batteries test at 37° C.

TABLE V

| KΩ LOAD | DAYS ON TEST | VOLT-AGE MEAN | IMPE-DANCE MEAN | MEAN MAH | NUMBER OF GOOD READINGS |
|---|---|---|---|---|---|
| 9999 | 0 | 2810.0 | 244.5 | 0.0 | 10 |
| 10 | 1 | 2449.0 | 917.5 | 0.0 | 10 |
| 10 | 6 | 2449.0 | 917.5 | 29.4 | 10 |
| 10 | 7 | 2375.6 | 1123.0 | 35.2 | 9 |
| 10 | 9 | 2312.4 | 1364.2 | 46.4 | 9 |
| 10 | 13 | 2107.0 | 2035.1 | 67.6 | 9 |
| 10 | 15 | 1951.2 | 2579.3 | 77.4 | 10 |
| 10 | 16 | 1603.0 | 3702.1 | 81.7 | 9 |
| 10 | 17 | 1114.8 | 5383.4 | 84.9 | 7 |
| 10 | 20 | 0.0 | 0.0 | 88.9 | 0 |

TABLE VI

| KΩ LOAD | DAYS ON TEST | VOLT-AGE MEAN | IMPE-DANCE MEAN | MEAN MAH | NUMBER OF GOOD READINGS |
|---|---|---|---|---|---|
| 9999 | 0 | 2808.9 | 284.6 | 0.0 | 10 |
| 25 | 1 | 2685.7 | 573.3 | 0.0 | 10 |
| 25 | 6 | 2685.7 | 573.3 | 12.9 | 10 |
| 25 | 7 | 2681.7 | 614.7 | 15.5 | 10 |
| 25 | 9 | 2617.0 | 748.4 | 20.6 | 10 |
| 25 | 13 | 2634.5 | 932.0 | 30.6 | 10 |
| 25 | 15 | 2588.4 | 1054.4 | 35.7 | 10 |
| 25 | 16 | 2596.3 | 1103.8 | 38.1 | 10 |
| 25 | 17 | 2600.9 | 1165.7 | 40.6 | 10 |
| 25 | 20 | 2515.7 | 1339.4 | 48.0 | 10 |
| 25 | 21 | 2566.1 | 1402.8 | 50.4 | 10 |
| 25 | 22 | 2546.1 | 1549.4 | 52.9 | 9 |
| 25 | 27 | 2486.5 | 1934.4 | 65.0 | 9 |
| 25 | 28 | 2440.5 | 2139.8 | 67.3 | 10 |
| 25 | 35 | 2053.5 | 5270.2 | 82.4 | 10 |
| 25 | 38 | 1426.6 | 10143.0 | 87.5 | 9 |
| 25 | 42 | 1176.1 | 12959.0 | 92.5 | 3 |

Tables VII and VIII
P4VP ethyl bromide, 30:1 iodine:organic ratio, 15% absorbent.
Bulk polymerized (52.5 g 4VP and 49.04 g ethyl bromide @ 21° C.).
Batteries tested at 37° C.

TABLE VII

| KΩ LOAD | DAYS ON TEST | VOLT-AGE MEAN | IMPE-DANCE MEAN | MEAN MAH | NUMBER OF GOOD READINGS |
|---|---|---|---|---|---|
| 9999 | 0 | 2810.1 | 351.8 | 0.0 | 9 |
| 10 | 1 | 2344.8 | 1224.6 | 0.0 | 9 |
| 10 | 6 | 2344.8 | 1224.6 | 28.1 | 9 |
| 10 | 7 | 2319.2 | 1299.4 | 33.7 | 9 |
| 10 | 9 | 2205.3 | 1632.4 | 44.6 | 9 |
| 10 | 13 | 2037.4 | 2237.0 | 65.0 | 9 |
| 10 | 15 | 1809.9 | 3003.1 | 74.2 | 9 |
| 10 | 16 | 1480.4 | 4113.8 | 78.1 | 9 |
| 10 | 17 | 1280.9 | 4814.4 | 81.5 | 9 |
| 10 | 20 | 0.0 | 0.0 | 86.1 | 9 |

TABLE VIII

| KΩ LOAD | DAYS ON TEST | VOLT-AGE MEAN | IMPE-DANCE MEAN | MEAN MAH | NUMBER OF GOOD READINGS |
|---|---|---|---|---|---|
| 9999 | 0 | 2808.7 | 351.6 | 0.0 | 7 |
| 25 | 1 | 2650.8 | 651.1 | 0.0 | 7 |
| 25 | 6 | 2650.8 | 651.1 | 12.7 | 7 |
| 25 | 7 | 2647.6 | 692.8 | 15.3 | 6 |
| 25 | 9 | 2633.6 | 801.2 | 20.3 | 6 |
| 25 | 13 | 2581.6 | 1198.1 | 30.4 | 7 |
| 25 | 15 | 2613.3 | 959.0 | 35.3 | 7 |
| 25 | 16 | 2593.4 | 1047.4 | 37.8 | 7 |
| 25 | 17 | 2522.2 | 1668.4 | 40.3 | 7 |
| 25 | 20 | 2508.1 | 1756.9 | 47.5 | 7 |
| 25 | 21 | 2575.1 | 1231.7 | 50.0 | 7 |
| 25 | 22 | 2492.8 | 1733.1 | 52.4 | 7 |
| 25 | 27 | 2468.5 | 1920.3 | 64.3 | 7 |
| 25 | 28 | 2414.2 | 2376.1 | 66.7 | 7 |
| 25 | 35 | 1843.0 | 6686.9 | 81.0 | 7 |
| 25 | 38 | 1324.5 | 10708.4 | 85.5 | 5 |
| 25 | 42 | 1117.9 | 12359.0 | 90.2 | 1 |

Tables IX and X
P4VP butyl bromide, 30:1 iodine:organic ratio, 15% absorbent.
Bulk polymerized (52.5 g 4VP and 61.7 g n-butylbromide @ 20° C.).
Batteries tested at 37° C.

TABLE IX

| KΩ LOAD | DAYS ON TEST | VOLT-AGE MEAN | IMPE-DANCE MEAN | MEAN MAH | NUMBER OF GOOD READINGS |
|---|---|---|---|---|---|
| 9999 | 0 | 2806.7 | 291.6 | 0.0 | 8 |
| 10 | 1 | 2341.0 | 1183.1 | 0.0 | 8 |
| 10 | 6 | 2341.0 | 1183.1 | 28.1 | 8 |
| 10 | 7 | 2306.1 | 1307.6 | 33.7 | 8 |
| 10 | 9 | 2218.2 | 1616.1 | 44.5 | 8 |
| 10 | 13 | 2036.4 | 2205.8 | 65.0 | 8 |
| 10 | 15 | 1901.2 | 2654.6 | 74.4 | 9 |
| 10 | 16 | 1720.4 | 3253.8 | 78.8 | 9 |
| 10 | 17 | 1420.2 | 4269.0 | 82.5 | 9 |
| 10 | 20 | 2369.2 | 1137.0 | 96.2 | 1 |

TABLE X

| KΩ LOAD | DAYS ON TEST | VOLT-AGE MEAN | IMPE-DANCE MEAN | MEAN MAH | NUMBER OF GOOD READINGS |
|---|---|---|---|---|---|
| 9999 | 0 | 2806.3 | 306.9 | 0.0 | 8 |
| 25 | 1 | 2630.2 | 741.4 | 0.0 | 8 |
| 25 | 6 | 2630.2 | 741.4 | 12.6 | 8 |
| 25 | 7 | 2565.6 | 1263.4 | 15.1 | 8 |
| 25 | 9 | 2612.3 | 882.9 | 20.1 | 7 |
| 25 | 13 | 2575.9 | 1180.0 | 30.1 | 7 |
| 25 | 15 | 2565.0 | 1254.0 | 35.0 | 7 |
| 25 | 16 | 2552.8 | 1343.9 | 37.4 | 7 |
| 25 | 17 | 2548.6 | 1362.1 | 39.9 | 8 |

TABLE X-continued

| KΩ LOAD | DAYS ON TEST | VOLTAGE MEAN | IMPEDANCE MEAN | MEAN MAH | NUMBER OF GOOD READINGS |
|---|---|---|---|---|---|
| 25 | 20 | 2517.8 | 1616.6 | 47.2 | 8 |
| 25 | 21 | 2514.0 | 1615.5 | 49.6 | 8 |
| 25 | 22 | 2506.2 | 1661.4 | 52.0 | 8 |
| 25 | 27 | 2423.2 | 2253.9 | 63.8 | 8 |
| 25 | 28 | 2386.4 | 2497.5 | 66.2 | 8 |
| 25 | 35 | 1890.5 | 6179.9 | 80.5 | 8 |
| 25 | 38 | 1577.5 | 8463.8 | 85.5 | 6 |

Tables XI and XII
Poly N methyl 1,2bis(4-pyridinium iodide) ethylene 30:1 iodine:organic ratio, 15% absorbent.
Bulk polymerization (Example II).
Batteries tested at 37° C.

TABLE XI

| KΩ LOAD | DAYS ON TEST | VOLTAGE MEAN | IMPEDANCE MEAN | MEAN MAH | NUMBER OF GOOD READINGS |
|---|---|---|---|---|---|
| 9999 | 0 | 2813.6 | 534.2 | 0.0 | 10 |
| 10 | 1 | 2172.0 | 1901.4 | 0.0 | 8 |
| 10 | 6 | 2172.0 | 1901.4 | 26.1 | 8 |
| 10 | 7 | 2290.0 | 1463.4 | 31.4 | 9 |
| 10 | 9 | 1239.7 | ******* | 39.9 | 7 |
| 10 | 13 | 2034.5 | 2260.6 | 55.6 | 9 |
| 10 | 15 | 1548.8 | 3977.4 | 64.2 | 9 |
| 10 | 16 | 1350.4 | 4656.3 | 67.7 | 7 |
| 10 | 17 | 1263.1 | 5009.4 | 70.8 | 5 |

TABLE XII

| KΩ LOAD | DAYS ON TEST | VOLTAGE MEAN | IMPEDANCE MEAN | MEAN MAH | NUMBER OF GOOD READINGS |
|---|---|---|---|---|---|
| 9999 | 0 | 2809.7 | 345.3 | 0.0 | 3 |
| 25 | 1 | 2704.8 | 460.7 | 0.0 | 3 |
| 25 | 6 | 2704.8 | 460.7 | 13.0 | 3 |
| 25 | 7 | 2683.7 | 653.0 | 15.6 | 3 |
| 25 | 9 | 2685.8 | 594.0 | 20.7 | 3 |
| 25 | 13 | 2632.9 | 1008.7 | 30.9 | 3 |
| 25 | 15 | 2612.5 | 1199.3 | 36.0 | 3 |
| 25 | 16 | 2561.4 | 1844.3 | 38.5 | 3 |
| 25 | 17 | 2602.7 | 1283.3 | 40.9 | 3 |
| 25 | 20 | 2615.5 | 1089.0 | 48.5 | 3 |
| 25 | 21 | 2606.9 | 1139.3 | 51.0 | 3 |
| 25 | 22 | 2594.9 | 1218.7 | 53.5 | 3 |
| 25 | 27 | 2472.0 | 1983.3 | 65.6 | 3 |
| 25 | 28 | 2416.2 | 2388.3 | 68.0 | 3 |
| 25 | 35 | 0.0 | 0.0 | 76.1 | 0 |
| 25 | 38 | 836.6 | 14927.0 | 77.3 | 1 |
| 25 | 42 | 0.0 | 0.0 | 78.9 | 0 |

Tables XIII and XIV
P4VP propyliodide 30:1 iodine:organic ratio, 15% absorbent.
Batteries tested at 37° C.

TABLE XIII

| KΩ LOAD | DAYS ON TEST | VOLTAGE MEAN | IMPEDANCE MEAN | MEAN MAH | NUMBER OF GOOD READINGS |
|---|---|---|---|---|---|
| 9999 | 0 | 2806.5 | 443.3 | 0.0 | 10 |
| 10 | 1 | 2365.7 | 1188.0 | 0.0 | 10 |
| 10 | 6 | 2365.7 | 1188.0 | 28.4 | 10 |
| 10 | 7 | 2317.9 | 1402.5 | 34.0 | 10 |
| 10 | 9 | 2220.8 | 1659.7 | 44.9 | 10 |
| 10 | 13 | 1910.5 | 2646.9 | 64.7 | 9 |
| 10 | 15 | 1690.5 | 3374.0 | 73.4 | 10 |
| 10 | 16 | 1395.0 | 4196.8 | 77.1 | 10 |

TABLE XIII-continued

| KΩ LOAD | DAYS ON TEST | VOLTAGE MEAN | IMPEDANCE MEAN | MEAN MAH | NUMBER OF GOOD READINGS |
|---|---|---|---|---|---|
| 10 | 17 | 1126.2 | 5280.2 | 80.1 | 10 |

TABLE XIV

| KΩ LOAD | DAYS ON TEST | VOLTAGE MEAN | IMPEDANCE MEAN | MEAN MAH | NUMBER OF GOOD READINGS |
|---|---|---|---|---|---|
| 9999 | 0 | 2808.2 | 509.1 | 0.0 | 8 |
| 25 | 1 | 2644.0 | 904.7 | 0.0 | 7 |
| 25 | 6 | 2644.0 | 904.7 | 12.7 | 7 |
| 25 | 7 | 2634.1 | 941.6 | 15.2 | 7 |
| 25 | 9 | 2609.4 | 1137.0 | 20.3 | 7 |
| 25 | 13 | 2536.5 | 1440.0 | 30.1 | 8 |
| 25 | 15 | 2490.0 | 1801.1 | 35.0 | 8 |
| 25 | 16 | 2529.2 | 1908.3 | 37.4 | 8 |
| 25 | 17 | 2521.3 | 1712.9 | 39.8 | 8 |
| 25 | 20 | 2451.5 | 2004.5 | 47.0 | 8 |
| 25 | 21 | 2473.0 | 2082.5 | 49.3 | 8 |
| 25 | 22 | 2454.1 | 2209.5 | 51.7 | 8 |
| 25 | 27 | 2350.1 | 2947.5 | 63.2 | 8 |
| 25 | 28 | 2315.3 | 3197.5 | 65.5 | 8 |
| 25 | 35 | 1762.6 | 7455.4 | 79.2 | 8 |
| 25 | 38 | 1378.8 | 10599.2 | 83.7 | 6 |

Tables XV and XVI
Crystal violet 30:1 iodine:organic ratio, 16% absorbent.

TABLE XV

| KΩ LOAD | DAYS ON TEST | VOLTAGE MEAN | IMPEDANCE MEAN | MEAN MAH | NUMBER OF GOOD READINGS |
|---|---|---|---|---|---|
| 9999 | 0 | 2807.6 | 433.1 | 0.0 | 9 |
| 100 | 1 | 2760.3 | 1057.2 | 0.0 | 9 |
| 100 | 6 | 2737.2 | 1554.6 | 3.3 | 9 |
| 100 | 7 | 2734.7 | 1600.2 | 4.0 | 9 |
| 100 | 8 | 2722.8 | 1820.1 | 4.6 | 9 |
| 100 | 11 | 2714.3 | 1946.2 | 6.6 | 9 |
| 100 | 13 | 2708.9 | 2048.4 | 7.9 | 9 |
| 100 | 14 | 2706.0 | 2103.0 | 8.5 | 9 |
| 100 | 18 | 2697.2 | 2206.9 | 11.1 | 9 |
| 100 | 19 | 2694.1 | 2314.4 | 11.8 | 9 |
| 100 | 20 | 2690.4 | 2390.2 | 12.4 | 9 |
| 100 | 21 | 2687.4 | 2447.7 | 13.1 | 9 |
| 100 | 22 | 2685.3 | 2500.7 | 13.7 | 9 |
| 100 | 23 | 2681.9 | 2537.3 | 14.3 | 9 |
| 100 | 25 | 2676.4 | 2650.8 | 15.6 | 9 |
| 100 | 26 | 2675.3 | 2700.6 | 16.3 | 9 |
| 100 | 28 | 2668.2 | 2826.6 | 17.6 | 9 |
| 100 | 33 | 2654.9 | 3101.4 | 20.8 | 9 |
| 100 | 40 | 2636.3 | 3503.8 | 25.2 | 9 |
| 100 | 47 | 2620.9 | 3873.9 | 29.6 | 9 |
| 100 | 54 | 2599.7 | 4358.7 | 34.0 | 9 |
| 100 | 62 | 2576.3 | 4908.2 | 39.0 | 9 |
| 100 | 75 | 2543.4 | 5711.4 | 47.0 | 9 |
| 100 | 89 | 2511.3 | 6517.4 | 55.4 | 9 |
| 100 | 98 | 2487.8 | 7118.1 | 60.8 | 9 |
| 100 | 103 | 2478.9 | 7394.9 | 63.8 | 9 |
| 100 | 110 | 2457.2 | 7950.7 | 68.0 | 9 |
| 100 | 125 | 2413.4 | 9020.3 | 76.7 | 9 |
| 100 | 131 | 2399.1 | 9426.8 | 80.2 | 9 |
| 100 | 138 | 2385.3 | 9874.1 | 84.2 | 9 |
| 100 | 145 | 2365.4 | 10348.8 | 88.2 | 9 |
| 100 | 152 | 2351.1 | 10833.6 | 92.2 | 9 |
| 100 | 159 | 2321.6 | 9988.9 | 96.1 | 9 |
| 100 | 166 | 2269.9 | 11740.2 | 100.0 | 9 |
| 100 | 180 | 2219.6 | 13431.8 | 107.5 | 9 |
| 100 | 189 | 2097.0 | 20802.1 | 112.2 | 9 |
| 100 | 201 | 1938.1 | 16023.5 | 118.0 | 6 |
| 100 | 208 | 1792.0 | 21255.4 | 121.1 | 5 |

TABLE XV-continued

| KΩ LOAD | DAYS ON TEST | VOLT- AGE MEAN | IMPE- DANCE MEAN | MEAN MAH | NUMBER OF GOOD READINGS |
|---|---|---|---|---|---|
| 100 | 215 | 1466.9 | 26221.5 | 123.8 | 4 |

TABLE XVI

| KΩ LOAD | DAYS ON TEST | VOLT- AGE MEAN | IMPE- DANCE MEAN | MEAN MAH | NUMBER OF GOOD READINGS |
|---|---|---|---|---|---|
| 9999 | 0 | 2808.1 | 377.9 | 0.0 | 8 |
| 50 | 1 | 2727.1 | 932.0 | 0.0 | 8 |
| 50 | 6 | 2686.9 | 1402.5 | 6.5 | 8 |
| 50 | 7 | 2676.5 | 1540.1 | 7.8 | 8 |
| 50 | 8 | 2631.7 | 2160.6 | 9.1 | 8 |
| 50 | 11 | 2621.1 | 2201.1 | 12.8 | 8 |
| 50 | 13 | 2606.7 | 2376.9 | 15.4 | 9 |
| 50 | 14 | 2586.7 | 2673.9 | 16.6 | 9 |
| 50 | 18 | 2563.7 | 2860.8 | 21.5 | 9 |
| 50 | 19 | 2551.7 | 3013.8 | 22.8 | 9 |
| 50 | 20 | 2539.3 | 3164.1 | 24.0 | 9 |
| 50 | 21 | 2528.0 | 3293.9 | 25.2 | 9 |
| 50 | 22 | 2519.1 | 3414.7 | 26.4 | 9 |
| 50 | 23 | 2511.3 | 3485.9 | 27.6 | 9 |
| 50 | 25 | 2485.5 | 3823.4 | 30.0 | 9 |
| 50 | 26 | 2482.3 | 3843.1 | 31.2 | 9 |
| 50 | 28 | 2459.0 | 4116.6 | 33.6 | 9 |
| 50 | 33 | 2406.0 | 4753.2 | 39.4 | 9 |
| 50 | 40 | 2338.4 | 5590.8 | 47.4 | 9 |
| 50 | 47 | 2282.3 | 6292.8 | 55.2 | 9 |
| 50 | 54 | 2212.2 | 7165.4 | 62.7 | 9 |
| 50 | 62 | 2133.1 | 8164.7 | 71.1 | 9 |
| 50 | 75 | 2032.3 | 9422.0 | 84.1 | 9 |
| 50 | 89 | 1937.6 | 10502.0 | 97.4 | 9 |
| 50 | 98 | 1831.7 | 11701.9 | 105.5 | 9 |
| 50 | 103 | 1737.4 | 12626.8 | 109.8 | 9 |
| 50 | 110 | 1549.7 | 14799.9 | 115.3 | 8 |
| 50 | 125 | 1078.0 | 20604.0 | 124.8 | 2 |

Table XVII
Crystal violet 30:1 iodine:organic ratio, absorbent 2% MgO and 10% P2VP.
Batteries tested at room temperature.

TABLE XVII

| KΩ LOAD | DAYS ON TEST | VOLT- AGE MEAN | IMPE- DANCE MEAN | MEAN MAH | NUMBER OF GOOD READINGS |
|---|---|---|---|---|---|
| 9999 | 0 | 2782.1 | 154.2 | 0.0 | 10 |
| 50 | 1 | 2578.1 | 1217.0 | 0.0 | 10 |
| 50 | 5 | 2629.8 | 968.7 | 5.0 | 10 |
| 50 | 8 | 2649.4 | 829.5 | 8.8 | 10 |
| 50 | 12 | 2630.9 | 868.2 | 13.9 | 10 |
| 50 | 19 | 2630.1 | 1089.6 | 22.7 | 10 |
| 50 | 26 | 2572.4 | 1594.4 | 31.5 | 10 |
| 50 | 33 | 2473.2 | 2692.8 | 39.9 | 10 |
| 50 | 40 | 2393.0 | 3632.3 | 48.1 | 10 |
| 50 | 48 | 2184.0 | 5647.0 | 56.9 | 10 |
| 50 | 50 | 2316.0 | 5184.4 | 58.9 | 9 |
| 50 | 54 | 2179.8 | 6678.7 | 62.8 | 9 |
| 50 | 56 | 2167.2 | 6840.1 | 64.7 | 9 |
| 50 | 61 | 1631.9 | 8089.1 | 68.8 | 9 |
| 50 | 67 | 1105.7 | 11110.6 | 70.9 | 5 |

TABLE XVII-continued

| KΩ LOAD | DAYS ON TEST | VOLT- AGE MEAN | IMPE- DANCE MEAN | MEAN MAH | NUMBER OF GOOD READINGS |
|---|---|---|---|---|---|
| 50 | 69 | 1094.2 | 11698.7 | 71.2 | 3 |

While presently preferred embodiments of the invention have been described in particularity, it may be otherwise embodied within the scope of the appended claims.

What is claimed is:

1. A depolarizer for use in a lithium halide battery comprising a charge transfer complex consisting of an organic component and a halogen, the halogen being present in excess of stoichiometric, the organic component being selected from the group consisting of phenyl methane dyes and said halogen being present in an amount of from 3:1 to 50:1 parts (by weight) for each part of organic component.

2. A depolarizer for use in a lithium halide battery comprising a charge transfer complex of an organic component, an absorbent and a halogen, said halogen being present in an amount of from 3:1 to 50:1 parts (by weight) for each part of organic component, and said organic component being selected from the group consisting of polyquaternary amine halides consisting of:
   (i) polyvinylalkylpyridinium halides or polyvinylalkylquinoline halides and
   (ii) poly[N-alkyl 1,2 bis (4-pyridinium halide) ethylene] or poly[N,N' dialkyl 1,2 (4-pyridinium halide) ethylene].

3. A depolarizer as set forth in claim 2 wherein said organic component is polyvinylpropylpyridinium iodide.

4. A depolarizer as set forth in claim 2 wherein said organic component is polyvinylbutylpyridinium iodide.

5. A depolarizer as set forth in claim 2 wherein said organic component is polyvinylethylpyridinium bromide.

6. A depolarizer as set forth in claim 2 wherein said organic component is polyvinylethylpyridinium iodide.

7. A depolarizer as set forth in claim 1 wherein said organic component is crystal violet.

8. A depolarizer as set forth in claim 1 wherein said organic component is auramine O.

9. A depolarizer as set forth in claim 1 wherein said organic component is methyl violet.

10. A depolarizer as set forth in claim 1 wherein said organic component is brilliant green.

11. A depolarizer as set forth in claim 2 including from 10 to 18% by weight of absorbent consisting of magnesium oxide and polyvinylpyridine.

12. A depolarizer as set forth in claim 2 wherein said absorbent consists of from 5 to 8% (by weight of the depolarizer) magnesium oxide and 5 to 10% (by weight of the depolarizer) of a compound selected from the group consisting of polyvinylpyrollidine and polyvinylpyridine.

13. A depolarizer as set forth in claim 1 wherein said organic is a phenyl methane dye, said depolarizer including an absorbent consisting of from 2 to 4% (by weight of depolarizer) magnesium oxide and from about 10 to 12% (by weight of depolarizer) polyvinylpyridine.

* * * * *

UNITED STATES PATENT AND TRADEMARK OFFICE
CERTIFICATE OF CORRECTION

PATENT NO. : 4,276,362

DATED : June 30, 1981

INVENTOR(S) : Marilyn J. Harney

It is certified that error appears in the above-identified patent and that said Letters Patent are hereby corrected as shown below:

Column 13, Table XVII, line 59, delete "1089.6" and substitute therefor -- 1039.6 --;

Column 13, Table XVII, line 65, delete "6840.1" and substitute therefor -- 6340.1 --.

Signed and Sealed this

Sixth Day of October 1981

[SEAL]

Attest:

GERALD J. MOSSINGHOFF

Attesting Officer     Commissioner of Patents and Trademarks